Patented Oct. 20, 1953

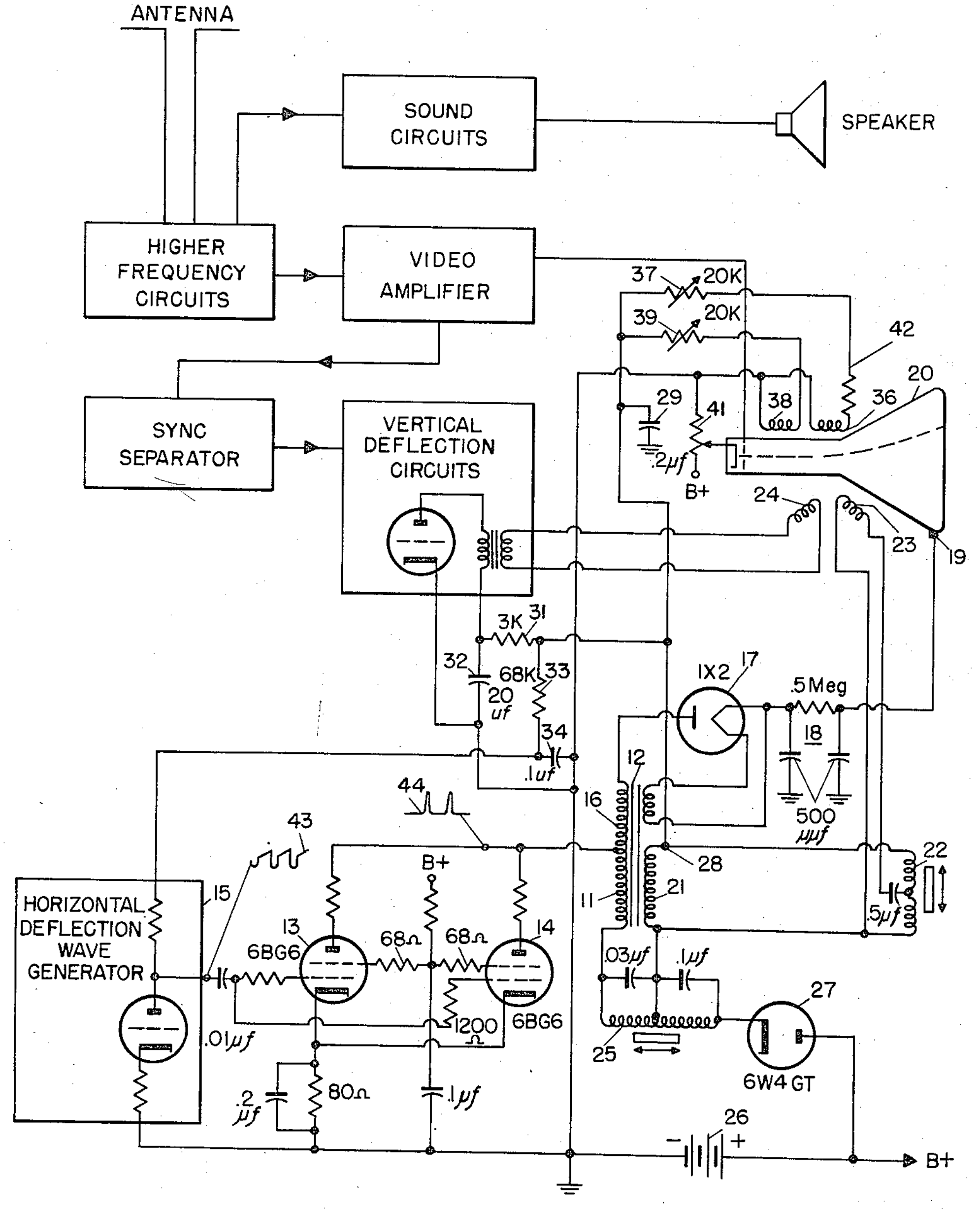
INVENTOR.
AMERICO F. GIORDANO
BY Daly & Daly
ATTORNEYS

2,656,486

UNITED STATES PATENT OFFICE 2,656,486

STABILIZED TELEVISION CIRCUIT

Americo F. Giordano, Newark, N. J., assignor to Allen B. Du Mont Laboratories, Inc., Clifton, N. J., a corporation of Delaware Application September 28, 1950, Serial No. 187,263

8 Claims. (Cl. 315—22)

This invention relates to television apparatus containing cathode-ray tubes, and more particularly to means for providing stabilized focus and ion trap adjustment of such tubes.

In the operation of a television receiver, certain conditions arise such as, for instance, change in brightness level, which often cause defocusing and a necessity for readjustment of the focus control.

An object of this invention is to provide stabilization in television receivers.

A further object is to provide a circuit in which the focus in a television receiver is stabilized against changes in brightness of the picture.

Other objects are to provide stabilization of focus and ion trap adjustment against variations in the high voltage supply such as are caused by the aging of tubes and the like, and against other variations of circuit elements during the operation of a television receiver.

In accordance with the invention, the direct current which energizes the focus coil is obtained from a portion of the circuit wherein voltage is dependent upon the operating condition of the cathode-ray tube.

The only figure of the drawing is a circuit diagram of a television receiver, well known circuits being shown in block form and circuits to which the present invention particularly relates being shown in schematic form.

An input winding 11 of a horizontal output transformer 12 is connected to the anodes of a pair of horizontal sweep amplifier tubes 13 and 14 which are connected to and driven by a signal source 15 comprising a horizontal deflection wave generator. A high voltage winding 16 of the horizontal output transformer 12 is connected to a rectifier 17, which is in turn connected to a filter circuit 18 and through this to an accelerating electrode 19 of a picture tube 20. A secondary winding 21 of the horizontal output transformer 12 is connected to a width control 22 and to a horizontal deflection coil 23. A vertical deflection coil 24 is connected in a well known manner to conventional vertical deflection circuits. A linearity control 25 connects the input winding 11 and the secondary winding 21, to a D. C. supply 26 of about 350 volts through a damper tube 27, this circuit being well known.

An end 28 of the secondary winding 21 is connected to a shunt condenser 29 and also to the vertical deflection circuits through a filter which comprises a series resistance 31 and a shunt capacitance 32, and to the horizontal deflection wave generator through a filter which comprises a series resistance 33 and a shunt capacitance 34. The said end 28 of the secondary winding 21 is also connected to a focus coil 36 through an adjustable focus control resistance 37, and to an ion trap coil 38 through an adjustable ion trap control resistance 39. The focus coil 36 and the ion trap coil 38 are preferably electromagnetic. A brightness control potentiometer 41 is connected to the cathode of the picture tube 20. A resistor 42 having a negative coefficient of resistance, is connected in series with the focus coil 36 and positioned to be affected by heat therefrom. Thus focus coil current is stabilized with respect to heating of the coil.

The operation of most of the circuit is well known. A drive wave 43 supplied from the horizontal deflection wave generator 15 produces a periodic current wave in the horizontal sweep amplifier tubes 13 and 14. During the periods of time the tubes 13 and 14 are cut off, the voltage 44 at the plates of these tubes becomes momentarily positive, charging the filter circuit 18 to supply high voltage to the accelerating anode 19 of the picture tube 20. A booster voltage appears at the terminal 28 by virtue of the action of the damper tube 27 on the flyback energy, charging the shunt condenser 29.

In the preferred embodiment of the invention shown, current is supplied to the vertical and horizontal sweep circuits from the boosted source. Also, current is supplied from the boosted voltage source to the focus coil 36 and ion trap coil 38.

An exemplary means by which the invention accomplishes stabilization of focus is as follows:

If the picture brightness is increased, as by adjustment of the brightness control or a change in program material, the electron beam of the picture tube 20 draws more current from the high voltage supply, causing a reduction in the magnitudes of the high voltage and boosted voltage; the exact amounts of voltage reduction being dependent in part on the regulation of the transformer 12.

The lowered value of high-voltage which thus occurs when the picture brightness is increased, tends to cause defocusing because the electrons in the beam move more slowly and are overly deflected by the magnetic field produced by the focus coil 36. At the same time and in accordance with this invention, the focus coil current is reduced because the coil is connected to the boosted voltage source. The reduced focus coil current causes a lowering of the intensity of the focusing magnetic field, so that good focus of the electron beam is obtained at the new value of accelerating voltage. The focus-compensating change of current in the focus coil occurs smoothly and continuously with ordinary changes in the accelerating and boosting voltages. When a replacement picture tube is installed which, due to individual tube variances, has more or less electron beam current than the tube it replaces, the present invention of stabilized focus will automatically provide focus coil current compensation in a manner as explained above.

The circuit disclosed in the present invention should provide focus stabilization when any operating condition arises that would tend to cause defocusing through a reduction of accelerating voltage due to regulation of the horizontal output transformer. Also, changes in the horizontal and vertical deflection circuits are compensated since these circuits are supplied power from the boosted voltage source.

Although the preceding description has been directed to stabilization of focus, the invention is also adapted towards stabilization of an ion trap. In a bent gun system, the negative ions are trapped in an ion trap and the electrons are deflected by an ion trap magnet to pass out of the electron gun toward the picture screen. The deflection of the electrons by the ion trap magnet is dependent upon the accelerating voltage. If the electron speed becomes reduced due to a reduction in the magnitude of accelerating voltage, the electron beam will tend to become overly deflected by the ion trap magnet. To compensate for this effect, the ion trap magnetic field must be reduced.

In accordance with my invention, the current in the ion trap magnet coil 38 is reduced or increased along with a reduction or increase of the speed of the electron beam, in a manner previously described in relation to the focus coil 36. The invention thus accomplishes stabilization of an ion trap, in addition to stabilization of focus.

Although specific embodiments have been shown and described, the scope of the invention is defined in the following claims.

What is claimed is:

1. In a television receiver, a cathode ray picture tube having an anode and an electron beam subject to variations, a first source of potential connected to said anode and a second source of potential connected to said first source, both said potentials being subject to variations in accordance with variations of said electron beam and an electromagnet positioned adjacent said tube and having an external magnetic field extending within said tube to influence said electron beam, said electromagnet being connected to said second source.

2. In a television receiver, a cathode tube having an anode, a source of electrical pulses, a transformer connected thereto, a rectifier connected between said transformer and said anode, and a focus coil connected to said transformer to derive operating voltage therefrom.

3. In a television receiver, the combination of a pulse source, a transformer connected thereto, a cathode ray tube having an anode, means for deriving a voltage for said anode from said transformer, a direct voltage source coupled to said transformer, and a rectifier connected to said transformer and said direct voltage source to produce a source of boosted direct voltage, and a focus coil connected to said source of boosted direct voltage.

4. In a television receiver, a cathode ray tube comprising an anode, a deflection transformer comprising a primary winding, a high voltage winding connected to supply voltage to said anode, and an output winding; a source of signals connected to said primary winding; a focus coil; and a series circuit comprising said coil, one end of said series circuit being connected directly to said output winding.

5. In a television receiver having a cathode ray tube containing an anode, a source of electrical pulses, a transformer, a primary winding and a secondary winding on said transformer, an electrical connection between said source of electrical pulses and said primary winding, a deflection coil electrically connected to said secondary winding, a rectifier connected to provide voltage to said anode from said transformer, a filter circuit connected to said secondary winding, and a focus coil electrically connected to said filter circuit.

6. The apparatus of claim 5, including an ion trap coil electrically connected to the said filter circuit.

7. The apparatus of claim 3 including an ion trap coil connected to said source of boosted direct voltage.

8. In a television receiver, a cathode ray tube having an anode and an electron beam subject to variations therein; a source of voltage connected to said anode; said voltage being subject to variations in accordance with changes of said electron beam; and an ion trap electromagnet positioned adjacent said cathode ray tube and having a winding connected to said source of voltage.

AMERICO F. GIORDANO.

References Cited in the file of this patent

UNITED STATES PATENTS

| Number | Name | Date |
|---|---|---|
| 2,219,194 | Mynall | Oct. 22, 1940 |
| 2,255,485 | Dome | Sept. 9, 1941 |
| 2,291,682 | Blumlein et al. | Aug. 4, 1942 |
| 2,430,331 | Galella et al. | Nov. 4, 1947 |
| 2,438,359 | Clapp | Mar. 23, 1948 |
| 2,443,030 | Foster | June 8, 1948 |
| 2,447,804 | Holst | Aug. 24, 1948 |
| 2,451,641 | Torsch | Oct. 19, 1948 |
| 2,512,779 | Sherwin et al. | June 27, 1950 |
| 2,555,147 | Meagher | May 29, 1951 |